(12) United States Patent
Tang

(10) Patent No.: US 10,939,436 B2
(45) Date of Patent: Mar. 2, 2021

(54) SIGNAL TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/305,096

(22) PCT Filed: Jul. 26, 2016

(86) PCT No.: PCT/CN2016/091722
§ 371 (c)(1),
(2) Date: Nov. 28, 2018

(87) PCT Pub. No.: WO2018/018418
PCT Pub. Date: Feb. 1, 2018

(65) Prior Publication Data
US 2020/0163087 A1     May 21, 2020

(51) Int. Cl.
*H04W 72/04* (2009.01)
(52) U.S. Cl.
CPC ..... *H04W 72/0453* (2013.01); *H04W 72/048* (2013.01)
(58) Field of Classification Search
CPC ............... H04W 72/048; H04W 72/0453
USPC ........................................... 370/329
See application file for complete search history.

(56) References Cited

U.S. PATENT DOCUMENTS

| 8,886,846 B2 | 11/2014 | Hussain |
| 2008/0205609 A1 | 8/2008 | Zhou |
| 2010/0046447 A1* | 2/2010 | Palanki ................ H04L 27/261 370/329 |

(Continued)

FOREIGN PATENT DOCUMENTS

| CN | 1613198 | 5/2005 |
| CN | 1849011 | 10/2006 |

(Continued)

OTHER PUBLICATIONS

WIPO, ISR for PCT/CN2016/091722, dated Apr. 24, 2017.

(Continued)

*Primary Examiner* — Phong La
(74) *Attorney, Agent, or Firm* — Hodgson Russ LLP

(57) ABSTRACT

The embodiments of the invention provide a signal transmission method and apparatus. The method comprises: a first apparatus determines a bandwidth and a quantity of subcarriers of a target channel, wherein the bandwidth and the quantity of the subcarriers of the target channel are determined according to a level and/or a type of terminal equipment using the target channel; and the first apparatus transmits, according to the bandwidth and the quantity of the subcarriers of the target channel, via the target channel, and to a second apparatus, a signal, or receives a signal sent from the second device via the target channel, wherein at least one of the first apparatus and the second apparatus is the terminal equipment. The embodiment of the invention can prevent resource wastage.

18 Claims, 2 Drawing Sheets

100

A first apparatus determines a bandwidth and a quantity of subcarriers of a target channel, wherein the bandwidth and the quantity of the subcarriers of the target channel are determined according to a level and/or a type of a terminal equipment using the target channel — 110

The first apparatus transmits, according to the bandwidth and the quantity of the subcarriers of the target channel, via the target channel, and to a second apparatus, a signal, or receives a signal sent from the second device via the target channel, wherein at least one of the first apparatus and the second apparatus is the terminal equipment — 120

(56) References Cited

U.S. PATENT DOCUMENTS

| | | | | |
|---|---|---|---|---|
| 2010/0254272 | A1* | 10/2010 | Chun | H04L 1/0029 370/252 |
| 2012/0131288 | A1* | 5/2012 | Box | G06F 15/7867 711/154 |
| 2012/0309308 | A1* | 12/2012 | Kim | H04B 5/0093 455/41.1 |
| 2014/0129738 | A1* | 5/2014 | Hussain | G06F 1/1632 710/8 |
| 2015/0237637 | A1 | 8/2015 | Venkatraman et al. | |
| 2016/0072613 | A1* | 3/2016 | Esserman | H04L 5/0037 370/230 |
| 2016/0135187 | A1 | 5/2016 | Cui et al. | |
| 2018/0034598 | A1* | 2/2018 | Yiu | H04W 24/10 |
| 2019/0013905 | A1* | 1/2019 | Yang | H04L 5/003 |

FOREIGN PATENT DOCUMENTS

| | | |
|---|---|---|
| CN | 101686552 | 3/2010 |
| CN | 102396286 | 3/2012 |
| CN | 102625464 | 8/2012 |
| EP | 2203011 | 6/2010 |
| TW | 201409975 | 3/2014 |
| WO | 2006046307 | 5/2006 |
| WO | 2011098124 | 8/2011 |
| WO | 2014087146 | 6/2014 |

OTHER PUBLICATIONS

EPO, Office Action for EP Application No. 16909999, dated May 13, 2019.
SIPO, First Office Action for CN Application No. 201680085538.4, dated Mar. 16, 2020.
Gao Zhai, Mobile Communications, Nov. 30, 2014.
Intellectual Property India, Office Action for IN Application No. 201817047858, dated Jul. 8, 2020.
3rd Generation Partnership Project, Technical Specification Group Radio Access Network; Evolved Universal Terrestrial Radio Access (E-UTRA); User Equipment (UE) radio access capabilities (Release 10), Sep. 2015.
SIPO, Second Office Action for CN Application No. 201680085538.4, dated Jun. 19, 2020.
SIPO, Decision of Rejection for CN Application No. 201680085538.4, dated Sep. 2, 2020.
JPO, Office Action for JP Application No. 2018-561668, dated Oct. 2, 2020.
TIPO, Office Action for TW Application No. 106123097, dated Oct. 30, 2020.

* cited by examiner

100

A first apparatus determines a bandwidth and a quantity of subcarriers of a target channel, wherein the bandwidth and the quantity of the subcarriers of the target channel are determined according to a level and/or a type of a terminal equipment using the target channel /110

The first apparatus transmits, according to the bandwidth and the quantity of the subcarriers of the target channel, via the target channel, and to a second apparatus, a signal, or receives a signal sent from the second device via the target channel, wherein at least one of the first apparatus and the second apparatus is the terminal equipment /120

Fig. 1

Signal Transmission Device 200

Processing Unit /210

Transceiver Unit /220

Fig. 2

SIGNAL TRANSMISSION METHOD AND DEVICE

CROSS-REFERENCE TO RELATED APPLICATION

This application is a U.S. national phase application of International Application No. PCT/CN2016/091722, filed Jul. 26, 2016, the entire disclosures of which is incorporated herein by reference.

TECHNICAL FIELD

The present application relates to the field of communications, and more particularly, to a signal transmission method and device.

BACKGROUND

With the development of network, service demands are constantly increasing, so do the types of service demand. In the existing network standard communication protocols, network devices and terminal devices use unified bandwidth or number of subcarriers to transmit signals when spectrums are utilized for signal transmission, and the spectrum bandwidths of different widths cannot be used sufficiently, resulting in waste of resources.

SUMMARY

The embodiments of the present application provide a signal transmission method and device, which can avoid waste of resources.

According to a first aspect, there is provided a signal transmission method, including:

determining, by a first device, a bandwidth and a number of subcarriers of a target channel, wherein the bandwidth or the number of subcarriers of the target channel is determined according to at least one of a level and a type of a terminal device using the target channel; and transmitting, by the first device, a signal to a second device via the target channel or receiving, by the first device, a signal transmitted by a second device via the target channel, according to the bandwidth and the number of subcarriers of the target channel, wherein at least one of the first device and the second device is a terminal device.

With reference to the first aspect, in a first possible implementation manner of the first aspect, the target channel is a channel for being accessed by the terminal device.

With reference to the first aspect or any one of the foregoing possible implementation manners, in a second possible implementation manner of the first aspect, the target channel is a synchronization channel, a random access channel, or a channel for transmitting system information.

With reference to the first aspect or any one of the foregoing possible implementation manners, in a third possible implementation manner of the first aspect, the signal is a downlink signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

With reference to the first aspect or any one of the foregoing possible implementation manners, in a fourth possible implementation manner of the first aspect, the signal is an uplink signal, the bandwidth of the target channel is greater than or equal to a minimum bandwidth corresponding to at least one of the level and the type of the terminal device using the target channel; and/or, the number of subcarriers of the target channel is greater than or equal to a minimum number of subcarriers corresponding to at least one of the level and the type of the terminal device using the target channel.

With reference to the first aspect or any one of the foregoing possible implementation manners, in a fifth possible implementation manner of the first aspect, the first device is a terminal device, and the second device is a terminal device;

the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

With reference to the first aspect or any one of the foregoing possible implementation manners, in a sixth possible implementation manner of the first aspect, the target channel belongs to a first channel type, the first channel type includes a plurality of channels, and different channels correspond to the terminal devices of different levels, different types, or different levels and types.

With reference to the first aspect or any one of the foregoing possible implementation manners, in a seventh possible implementation manner of the first aspect, the second device is a terminal device; and the determining, by the first device, the bandwidth and the number of subcarriers of the target channel includes:

determining, by the first device, a value range of the bandwidth of the target channel according to at least one of a level and a type of the second device;

determining the bandwidth of the target channel from the value range of the bandwidth of the target channel;

determining a subcarrier interval of the target channel; and determining the number of subcarriers of the target channel according to the bandwidth of the target channel and the subcarrier interval of the target channel.

With reference to the first aspect or any one of the foregoing possible implementation manners, in an eighth possible implementation manner of the first aspect, the first device is a network device, and the method further includes:

notifying, by the first device, value ranges of the bandwidths employed when the terminal devices of different levels, different types, or different levels and types use a channel of a first channel type, wherein the target channel belongs to the first channel type, the first channel type includes a plurality of channels, and different channels correspond to the terminal devices of different levels, different types, or different levels and types.

With reference to the first aspect or any one of the foregoing possible implementation manners, in a ninth possible implementation manner of the first aspect, the second device is a network device; and the determining, by the first device, the bandwidth and the number of subcarriers of the target channel includes:

determining, by the first device, a value range of the number of subcarriers of the target channel according to at least one of a level and a type of the second device;

determining the number of subcarriers of the target channel from the value range of the number of subcarriers of the target channel;

determining a subcarrier interval of the target channel; and determining the bandwidth of the target channel according to the number of subcarriers of the target channel and the subcarrier interval of the target channel.

With reference to the first aspect or any one of the foregoing possible implementation manners, in a tenth possible implementation manner of the first aspect, the first device is a network device, and the method further includes:

notifying, by the first device, value ranges of the numbers of subcarriers employed when the terminal devices of different levels, different types, or different levels and types use a channel of a first channel type, wherein:

the target channel belongs to the first channel type, the first channel type includes a plurality of channels, and different channels correspond to the terminal devices of different levels, different types, or different levels and types.

With reference to the first aspect or any one of the foregoing possible implementation manners, in an eleventh possible implementation manner of the first aspect, the first device is a terminal device; and the determining, by the first device, the bandwidth and the number of subcarriers of the target channel includes:

determining, by the first device, the bandwidth of the target channel from a value range of the bandwidth of the target channel;

determining a subcarrier interval of the target channel; and determining, by the first device, the number of subcarriers of the target channel according to the bandwidth of the target channel and the subcarrier interval of the target channel.

With reference to the first aspect or any one of the foregoing possible implementation manners, in a twelfth possible implementation manner of the first aspect, the first device is a terminal device; and before the determining, by the first device, the bandwidth and the number of subcarriers of the target channel, the method further includes:

receiving, by the first device, first instruction information transmitted by a network device, the first instruction information being used to indicate, for a channel of a first channel type, a number of subcarriers corresponding to at least one of the level and the type of the terminal device;

wherein, the target channel belongs to the first channel type, the first channel type includes a plurality of channels, and different channels correspond to the terminal devices of different levels, different types, or different levels and types.

With reference to the first aspect or any one of the foregoing possible implementation manners, in a thirteenth possible implementation manner of the first aspect, the first device is a terminal device; and the determining, by the first device, the bandwidth and the number of subcarriers of the target channel includes:

determining, by the first device, the number of subcarriers of the target channel from a value range of the number of subcarriers of the target channel;

determining a subcarrier interval of the target channel; and determining the bandwidth of the target channel according to the number of subcarriers and the subcarrier interval of the target channel With reference to the first aspect or any one of the foregoing possible implementation manners, in a fourteenth possible implementation manner of the first aspect, the first device is a terminal device; and before the determining, by the first device, the bandwidth and the number of subcarriers of the target channel, the method further includes:

receiving, by the first device, second instruction information transmitted by a network device, the second instruction information being used to indicate, for a channel of a first channel type, a number of subcarriers of the target channel corresponding to at least one of the level and the type of the terminal device, wherein:

the target channel belongs to the first channel type, the first channel type includes a plurality of channels, and different channels correspond to the terminal devices of different levels, different types, or different levels and types.

With reference to the first aspect or any one of the foregoing possible implementation manners, in a fifteenth possible implementation manner of the first aspect, the determining the subcarrier interval of the target channel includes:

determining a target basic parameter set from a plurality of basic parameter sets; and determining the subcarrier interval of the target channel from the target basic parameter set.

According to a second aspect, there is provided a signal transmission device configured to perform the methods according to the first aspect or any optional embodiment of the above first aspect. Specifically, the signal transmission device includes units configured to perform the methods according to the first aspect or any optional embodiment of the above first aspect.

According to a third aspect, there is provided a signal transmission device, including: a memory and a processor, wherein the memory is configured to store instructions, and the processor is configured to execute the instructions stored by the memory, and when the processor executes the instructions stored by the memory, the executing causes the processor to perform the methods according to the first aspect or any optional embodiment of the first aspect.

According to a fourth aspect, there is provided a computer storage medium storing a program code which is configured to perform the methods according to the first aspect or any optional embodiment of the first aspect.

According to a fifth aspect, there is provided a communication system, including the first and second devices mentioned in the first aspect.

Therefore, in the embodiments of the present application, the bandwidth or the number of subcarriers of the channel for transmitting signals is determined according to at least one of the level and the type of the terminal device using the target channel, which can avoid the signals from being transmitted by using the uniform bandwidth or the number of subcarriers, and can make full use of spectrum resources of different widths to avoid waste of resources; and further, it is possible to design different subcarrier numbers and/or bandwidths for the terminal devices of different levels and/or types, which can meet the transmission needs of the terminal device on the base of avoiding the waste of resources.

BRIEF DESCRIPTION OF THE DRAWINGS

In order to illustrate the technical solutions of the embodiments of the present application more clearly, the drawings used in the description of the embodiments or the related art will be briefly described below. Obviously, the drawings in the following description merely involve some embodiments of the present application. For those of ordinary skills in the art, other drawings may also be obtained based on these drawings without going through any creative effort.

FIG. 1 is a schematic flow chart of a signal transmission method according to an embodiment of the present application.

FIG. 2 is a schematic block diagram of a signal transmission device according to an embodiment of the present application.

DETAILED DESCRIPTION

Figure 3:
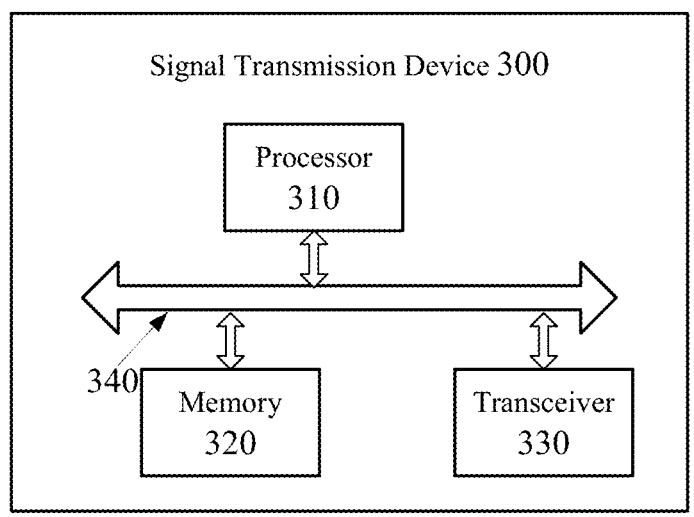
FIG. 3 is a schematic block diagram of a signal transmission device according to an embodiment of the present application.

The following clearly and completely describes the technical solutions in the embodiments of the present application with reference to the accompanying drawings in the embodiments of the present application. Apparently, the described embodiments are merely some but not all of the embodiments of the present application. Based on the embodiments of the present application, all other embodiments obtained by those of ordinary skills in the art without going through any creative effort shall fall within the scope of protection of the present application.

Various aspects or features of the present application can be implemented as a method, apparatus, or article of manufacture using standard programming and/or engineering techniques. The term "article of manufacture" as used in this application encompasses a computer program accessible from any computer-readable device, carrier, or medium. For example, the computer-readable medium may include, but is not limited to, a magnetic memory device (for example, a hard disk, a floppy disk, or a magnetic tape), and an optical disk (for example, a Compact Disk (CD), a Digital Versatile Disk (DVD)), smart cards and flash memory devices (for example, Erasable Programmable Read-Only Memory (EPROM), cards, sticks or key drivers, etc.). Additionally, various storage media described herein can represent one or more devices and/or other machine-readable media for storing information. The term "machine-readable medium" may include, but is not limited to, a wireless channel and various other media capable of storing, containing, and/or carrying instructions and/or data.

The technical solutions of the present application can be applied to various communication systems, for example: a Global System of Mobile Communication (GSM), a Code Division Multiple Access (CDMA) System, a Wideband Code Division Multiple Access (WCDMA) System, a General Packet Radio Service (GPRS), a Long Term Evolution (LTE) System, an Advanced Long Term Evolution (LTE-A) System, a Universal Mobile Telecommunication System (UMTS), 5G, or the like.

The technical solutions of the embodiments of the present application can be applied to communication between a terminal device and a network device, and can also be applied to communication between a terminal device and another terminal device (Device to Device, D2D).

In the embodiments of the present application, the network device may be a Base Transceiver Station (BTS) in GSM or CDMA, or a NodeB in WCDMA, or an Evolved Node B (eNB or e-NodeB) in LTE, and may also be a device for providing an access service in 5G, which is not limited in the embodiments of the present application.

The present application describes various embodiments in connection with the terminal device and the network device.

The terminal device may also be referred to as a User Equipment (UE), an access terminal, a user unit, a user station, a mobile station, a mobile, a remote station, a remote terminal, a mobile device, a user terminal, a terminal, a wireless communication device, a user agent or a user apparatus, etc. The terminal device may be a STATION (ST) in Wireless Local Area Networks (WLAN), and may be a cellular phone, a cordless phone, a Session Initiation Protocol (SIP) Phone, a Wireless Local Loop (WLL) Station, a Personal Digital Assistant (PDA), a handheld device with wireless communication capabilities, a computing device or other processing device connected to a wireless modem, an in-vehicle device, a wearable device, and a terminal device in future 5G networks, or a terminal device in a future evolved PLMN network.

The network device may be a device for communicating with the terminal device, and the network device may be an ACCESS POINT (AP) in Wireless Local Area Networks (WLAN), and a Base Transceiver Station (BTS) in GSM or Code Division Multiple Access (CDMA), may be a NodeB (NB) in WCDMA, or may also be an eNB or an Evolutional NodeB (eNodeB) in Long Term Evolution (LTE), or a relay station or an access point, or an in-vehicle device, a wearable device, and a network device in future 5G network or a network device in future evolved PLMN network.

The basic parameter set mentioned in the embodiments of the present application may include at least one of the following parameters:

a subcarrier interval, the number of subcarriers in a specific bandwidth, the number of subcarriers in a Physical Resource Block (PRB), a length of Orthogonal Frequency Division Multiplexing (OFDM) Symbol, the number of points of Fourier transform for generating OFDM signals, such as Fast Fourier Transform (FFT), or Inverse Fourier Transform, such as Inverse Fast Fourier Transform (IFFT), the number of OFDM symbols in the transmission time interval TTI, the number of TTIs included in a specific length of time, and a length of a signal prefix.

The subcarrier interval refers to a frequency interval between adjacent subcarriers, for example, 15 kHz, 60 kHz, etc. The number of subcarriers in a specific bandwidth is, for example, the number of subcarriers corresponding to each possible system bandwidth. The number of subcarriers included in the PRB may be, for example, an integer multiple of 12 typically. The number of OFDM symbols included in the TTI may be, for example, an integer multiple of 14 typically. The number of TTIs included in a certain time unit may refer to the number of TTIs included in the time length of 1 ms or 10 ms. The length of the signal prefix is, for example, the length of a cyclic prefix of the signal, or whether the cyclic prefix uses a regular CP or an extended CP.

FIG. 1 is a schematic flow chart of a signal transmission method 100 according to an embodiment of the present application. The method 100 may be used for a process of receiving or transmitting a signal by using a target channel, wherein a first device may be a terminal device, and a second device may be a network device; or, the first device may be a terminal device, and the second device may be a network device; or, the first device may be a terminal device, and the second device may be a terminal device.

As shown in FIG. 1, the method 100 includes steps 110 and 120.

In step 110, a first device determines a bandwidth and a number of subcarriers of a target channel, wherein the bandwidth or the number of subcarriers of the target channel is determined according to at least one of a level and a type of a terminal device using the target channel.

In step 120, the first device transmits a signal to a second device via the target channel, or receives a signal transmitted by the second device via the target channel, according to the bandwidth and the number of subcarriers of the target channel, wherein at least one of the first device and the second device is a terminal device.

Therefore, in the embodiments of the present application, the bandwidth or the number of subcarriers of the channel for transmitting signals is determined according to at least one of the level and the type of the terminal device using the target channel, which can avoid the signals from being transmitted by using the uniform bandwidth or number of subcarriers, and can make full use of spectrum resources of different widths to avoid waste of resources; and further, it is possible to design different subcarrier numbers and/or bandwidths for the terminal devices of different levels and/or types, which can meet the transmission needs of the terminal device on the base of avoiding the waste of resources.

Optionally, the target channel is a channel for being accessed by the terminal device.

Optionally, the target channel may be a synchronization channel, a random access channel or a channel for transmitting system information.

It should be understood that the target channel mentioned in this application may also be other channels in addition to the channel for being accessed by the terminal device.

Optionally, in the embodiments of the present application, the range of bandwidths and/or number of subcarriers corresponding to different channel types may be different.

Optionally, the signal mentioned in the embodiments of the present application may be an uplink signal or a downlink signal.

In an implementation manner, when the signal is a downlink signal, the bandwidth of the target channel is less than or equal to a minimum bandwidth corresponding to the level and/or the type of the terminal device using the target channel; and/or, the number of subcarriers of the target channel is less than or equal to a minimum number of subcarriers corresponding to the level and/or the type of the terminal device using the target channel.

In the implementation manner, the first device may be a terminal device, and the second device may be a network device; at this moment, the terminal device receives a downlink signal transmitted by the network device. Or, in the implementation manner, the first device may be a network device, and the second device may be a terminal device; at this moment, the network device transmits a downlink signal to the terminal device.

In another implementation manner, the signal is an uplink signal, the bandwidth of the target channel is greater than or equal to a minimum bandwidth corresponding to the level and/or the type of the terminal device using the target channel; and/or, the number of subcarriers of the target channel is greater than or equal to a minimum number of subcarriers corresponding to the level and/or the type of the terminal device using the target channel.

In the implementation manner, the first device may be a network device, and the second device may be a terminal device; at this moment, the network device may receive an uplink signal transmitted by the terminal device; or, in the implementation manner, the first device may be a terminal device, and the second device may be a network device; at this moment, the terminal device transmits an uplink signal to the network device.

Optionally, the signal mentioned in the embodiments of the present application may also be a D2D signal, for instance, the signal may be a discovery signal transmitted by the terminal device and used for being accessed by other terminal device.

In the implementation manner, the first device is a terminal device, and the second device is a terminal device; the bandwidth of the target channel is less than or equal to a minimum bandwidth corresponding to the level and/or the type of the terminal device using the target channel; and/or, the number of subcarriers of the target channel is less than or equal to a minimum number of subcarriers corresponding to the level and/or the type of the terminal device using the target channel.

Optionally, in the embodiments of the present application, the target channel belongs to a first channel type, the first channel type includes a plurality of channels, and different channels correspond to the terminal devices of different levels and/or types.

That is to say, a certain type of channel may be divided into multiple channels, and different channels may be used by the terminal devices of different levels and/or types, thereby further avoiding waste of resources and satisfying the transmission needs of the terminal devices of different levels and/or types.

Optionally, in the embodiments of the present application, the network device notifies value ranges of the bandwidths employed when the terminal devices of different levels and/or types use the channel of the first channel type.

Optionally, in the embodiments of the present application, the network device notifies value ranges of the numbers of subcarriers employed when the terminal devices of different levels and/or types use the channel of the first channel type.

Optionally, in the embodiments of the present application, the network device may notify the value ranges of the bandwidths or the numbers of subcarriers employed when the terminal devices of different levels and/or types use the channel of the first channel type by means of broadcast, multicast or proprietary signaling.

Optionally, in the embodiments of the present application, the network device may notify the value ranges of the bandwidths or the numbers of subcarriers employed when the terminal devices of different levels and/or types use the channel of the first channel type via a physical downlink control channel.

It should be understood that the value range of the number of subcarriers or the value range of the bandwidth mentioned in the embodiments of the present application may include only one value, or may be a set including a finite number of values, or may be a set including an infinite number of values, which will not be limited in the embodiments of the present application.

Optionally, in the embodiments of the present application, the first device may determine the subcarrier interval of the target channel from the basic parameter set for determining the number of subcarriers of the target channel in conjunction with the bandwidth of the target channel.

Specifically, the number of subcarriers $N_{sc,i}$ may be determined according to a formula $N_{sc,i}=BW_{ac}/f_{sc,i}$, where $BW_{ac}$ is the bandwidth of the target channel, and $f_{sc,i}$ is the subcarrier interval of the target channel.

Optionally, in the embodiments of the present application, the first device may determine the subcarrier interval of the target channel from the basic parameter set for determining the bandwidth of the target channel in conjunction with the number of subcarriers of the target channel.

Specifically, the bandwidth of the target channel may be determined according to a formula $Bw_{ac,i}=f_{sc,j}*N_{sc,i}$, where $f_{sc,j}$ is the subcarrier interval of the target channel, and $N_{sc,i}$ is the number of subcarriers of the target channel.

In the embodiments of the present application, the first device may select a target basic parameter set from a plurality of basic parameter sets, and determine the subcarrier interval of the target channel from the target basic parameter set.

To facilitate understanding the present application, the signal transmission method according to the embodiments of the present application will be described hereinafter by taking a second device being a terminal device as an example.

It should be understood that the value range of the bandwidth of the target channel (transmitting uplink signals, downlink signals, or D2D signals) in the signal transmission method described below may satisfy the following conditions:

when the signal is a downlink signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel. When the signal is an uplink signal, the bandwidth of the target channel is greater than or equal to a minimum bandwidth corresponding to at least one of the level and the type of the terminal device using the target channel; and/or, the number of subcarriers of the target channel is greater than or equal to a minimum number of subcarriers corresponding to at least one of the level and the type of the terminal device using the target channel. When the signal is a D2D signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

The first device may be a network device or a terminal device; if the first device is a terminal device, then communication between the first device and the second device may be referred to as D2D communication.

In an implementation manner, the first device determines the value range of the bandwidth of the target channel according to at least one of the level and the type of the terminal device; determines the bandwidth of the target channel from the value range of the bandwidth of the target channel; determines a subcarrier interval of the target channel; determines the number of subcarriers of the target channel according to the bandwidth of the target channel and the subcarrier interval of the target channel; and receives or transmit the signal via the target channel according to the number of subcarriers of the target channel and the bandwidth of the channel.

Optionally, in the implementation manner, the network device may notify the value ranges of the bandwidths employed when the terminal devices of different levels and/or types use the channel of the first channel type.

If the first device is a terminal device, then the first device may, when needing to communicate with the second device, determine at least one of the level and the type of the second device, and determine the value range of the bandwidth corresponding to at least one of the level and the type according to the notification of the network device.

If the first device is a network device, then the network device may notify the value ranges of the bandwidths employed when the terminal devices of different levels and/or types use the channel of the first channel type, and when transmitting a signal with the terminal device of a certain level and/or type, may search the value range of the bandwidth corresponding to the terminal device of the level and/or the type.

In another implementation manner, the first device determines the value range of the number of subcarriers of the target channel according to at least one of the level and the type of the terminal device; determines the number of subcarriers of the target channel from the value range of the number of subcarriers of the target channel; determines a subcarrier interval of the target channel; determines the bandwidth of the target channel according to the number of subcarriers of the target channel and the subcarrier interval of the target channel; and receives or transmit the signal via the target channel according to the number of subcarriers of the target channel and the bandwidth of the channel.

Optionally, in the implementation manner, the network device may broadcast the value range of the number of subcarriers employed when the terminal devices of different levels and/or types use the channel of the first channel type.

If the first device is a terminal device, then the first device may, when needing to communicate with the second device, determine at least one of the level and the type of the first device, and determine the value range of the number of subcarriers corresponding to at least one of the level and the type according to the notification of the network device.

If the first device is a network device, then the network device may notify the value ranges of the numbers of subcarriers employed when the terminal devices of different levels and/or types use the channel of the first channel type, and when transmitting a signal with the terminal device of a certain level and/or type, may search the value range of the number of subcarriers corresponding to the terminal device of the level and/or the type.

The signal transmission method according to the embodiments of the present application will be described in details hereinafter by taking a first device being a terminal device as an example. It should be understood that the value range of the bandwidth of the target channel (transmitting uplink signals, downlink signals, or D2D signals) in the signal transmission method described below may satisfy the following conditions:

when the signal is a downlink signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel. When the signal is an uplink signal, the bandwidth of the target channel is greater than or equal to a minimum bandwidth corresponding to at least one of the level and the type of the terminal device using the target channel; and/or, the number of subcarriers of the target channel is greater than or equal to a minimum number of subcarriers corresponding to at least one of the level and the type of the terminal device using the target channel. When the signal is a D2D signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

The second device may be a network device or a terminal device; if the second device is a terminal device, then communication between the first device and the second device may be referred to as D2D communication.

In an implementation manner, the terminal device determines the bandwidth of the target channel from the value range of the bandwidth of the target channel; and determines a subcarrier interval of the target channel; the terminal device determines the number of subcarriers of the target channel according to the bandwidth of the target channel and the subcarrier interval of the target channel; and receives or transmit the signal via the target channel according to the number of subcarriers of the target channel and the bandwidth of the channel.

Optionally, in the implementation manner, the network device may notify the value ranges of the bandwidths employed when the terminal devices of different levels and/or types use the channel of the first channel type. The terminal device may acquire the bandwidth of the channel of the first channel type corresponding to the level and/or the type thereof according to the notification of the network device.

In another implementation manner, the terminal device determines the number of subcarriers of the target channel from the value range of the number of subcarriers of the target channel; determines a subcarrier interval of the target channel; determines the bandwidth of the target channel according to the number of subcarriers and the subcarrier interval of the target channel; and receives or transmit the signal via the target channel according to the number of subcarriers of the target channel and the bandwidth of the channel.

Optionally, in the implementation manner, the network device may notify the value ranges of the numbers of subcarriers employed when the terminal devices of different levels and/or types use the channel of the first channel type. The terminal device may acquire the number of subcarriers of the channel of the first channel type corresponding to the level and/or the type thereof according to the notification of the network device.

Therefore, in the embodiments of the present application, the bandwidth or the number of subcarriers of the channel for transmitting signals is determined according to at least one of the level and the type of the terminal device using the target channel, which can avoid the signals from being transmitted by using the uniform bandwidth or the number of subcarriers, and can make full use of spectrum resources of different widths to avoid waste of resources; and further, it is possible to design different subcarrier numbers and/or bandwidths for the terminal devices of different levels and/or types, which can meet the transmission needs of the terminal device on the base of avoiding the waste of resources.

FIG. 2 is a schematic block diagram of a signal transmission device 200 according to an embodiment of the present application. As shown in FIG. 2, the device 200 includes a processing unit 210 and a transceiver unit 220. The device 200 may be referred to as a first device.

The processing unit 210 is configured to determine a bandwidth and a number of subcarriers of a target channel, wherein the bandwidth or the number of subcarriers of the target channel is determined according to at least one of a level and a type of a terminal device using the target channel.

The transceiver unit 220 is configured to transmit a signal to a second device via the target channel, or receive a signal transmitted by the second device via the target channel, according to the bandwidth and the number of subcarriers of the target channel, wherein at least one of the device 200 and the second device is a terminal device.

Optionally, the target channel is a channel for being accessed by the terminal device.

Optionally, the target channel is a synchronization channel, a random access channel or a channel for transmitting system information.

Optionally, the signal is a downlink signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

Optionally, the signal is an uplink signal, the bandwidth of the target channel is greater than or equal to a minimum bandwidth corresponding to at least one of the level and the type of the terminal device using the target channel; and/or, the number of subcarriers of the target channel is greater than or equal to a minimum number of subcarriers corresponding to at least one of the level and the type of the terminal device using the target channel.

Optionally, the signal may also be a D2D signal, for instance, the signal may be a discovery signal transmitted by the terminal device and used for being accessed by other terminal device.

In the implementation manner, the device 200 is a terminal device, and the second device is a terminal device; the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

Optionally, the target channel belongs to the first channel type, the first channel type includes a plurality of channels, and different channels correspond to the terminal devices of different levels and/or types.

Optionally, the second device is a terminal device; and the processing unit 210 is specifically configured to:

determine a value range of the bandwidth of the target channel according to at least one of a level and a type of the second device;

determine the bandwidth of the target channel from the value range of the bandwidth of the target channel;

determine a subcarrier interval of the target channel; and determine the number of subcarriers of the target channel according to the bandwidth of the target channel and the subcarrier interval of the target channel.

Optionally, the device 200 is a network device, and the transceiver unit 220 is further configured to:

notify value ranges of the bandwidths employed when the terminal devices of different levels and/or types use the channel of the first channel type, wherein the target channel belongs to a first channel type, the first channel type includes a plurality of channels, and different channels correspond to the terminal devices of different levels and/or types.

Optionally, the second device is a terminal device; and the processing unit 210 is specifically configured to:

determine a value range of the number of subcarriers of the target channel according to at least one of a level and a type of the second device;

determine the number of subcarriers of the target channel from the value range of the number of subcarriers of the target channel;

determine a subcarrier interval of the target channel; and determine the bandwidth of the target channel according to the number of subcarriers of the target channel and the subcarrier interval of the target channel.

Optionally, the device 200 is a network device, and the transceiver unit 220 is further configured to:

notify value ranges of the numbers of subcarriers employed when the terminal devices of different levels and/or types use the channel of the first channel type, wherein:

the target channel belongs to a first channel type, the first channel type includes a plurality of channels, and different channels correspond to the terminal devices of different levels and/or types.

Optionally, the device 200 is a terminal device; and the processing unit 210 is further configured to:

determine the bandwidth of the target channel from the value range of the bandwidth of the target channel;

determine a subcarrier interval of the target channel; and determine the number of subcarriers of the target channel according to the bandwidth of the target channel and the subcarrier interval of the target channel.

Optionally, the device 200 is a terminal device, and the transceiver unit 220 is further configured to:

receive first instruction information transmitted by a network device, the first instruction information being used to indicate, for a channel of a first channel type, a number of subcarriers corresponding to at least one of the level and the type of the terminal device;

wherein, the target channel belongs to the first channel type, the first channel type includes a plurality of channels, and different channels correspond to the terminal devices of different levels and/or types.

Optionally, the device 200 is a terminal device; and the processing unit 210 is further configured to:

determine the number of subcarriers of the target channel from the value range of the number of subcarriers of the target channel;

determine a subcarrier interval of the target channel; and determine the bandwidth of the target channel according to the number of subcarriers and the subcarrier interval of the target channel.

Optionally, the device 200 is a terminal device, and the transceiver unit 220 is further configured to:

receive second instruction information transmitted by the network device, the second instruction information being used to indicate, for a channel of a first channel type, a number of subcarriers of the target channel corresponding to at least one of the level and the type of the terminal device, wherein:

the target channel belongs to the first channel type, the first channel type includes a plurality of channels, and different channels correspond to the terminal devices of different levels and/or types.

Optionally, the processing unit 210 is specifically configured to:

determine a target basic parameter set from a plurality of basic parameter sets; and determine the subcarrier interval of the target channel from the target basic parameter set.

It should be understood that the device 200 may correspond to the first device in the method 100, and may implement the corresponding functions of the first device in the method 100, which will not be elaborated herein for brevity.

FIG. 3 is a schematic block diagram of a signal transmission device 300 according to an embodiment of the present application. The device 300 includes a processor 310, a memory 320 and a transceiver 330. The memory 320 is configured to store program instructions. The processor 310 may call the program instructions stored in the memory 320. The transceiver 330 is used for external communications. Optionally, the device 300 further includes a bus system 340 that interconnects the processor 310, the memory 320, and the transceiver 330. The device may be referred to as a first device.

Specifically, the processor 310 is configured to call the instructions stored in the memory 320 to perform the following operations:

determine a bandwidth and a number of subcarriers of a target channel, wherein the bandwidth or the number of subcarriers of the target channel is determined according to at least one of a level and a type of a terminal device using the target channel; and transmit a signal to a second device via the target channel or receive a signal transmitted by the second device via the target channel by using the transceiver 330, according to the bandwidth and the number of subcarriers of the target channel, wherein at least one of the first device and the second device is a terminal device.

Optionally, the target channel is a channel for being accessed by the terminal device.

Optionally, the target channel is a synchronization channel, a random access channel or a channel for transmitting system information.

Optionally, the signal is a downlink signal, the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

Optionally, the signal is an uplink signal, the bandwidth of the target channel is greater than or equal to a minimum bandwidth corresponding to at least one of the level and the type of the terminal device using the target channel; and/or, the number of subcarriers of the target channel is greater than or equal to a minimum number of subcarriers corresponding to at least one of the level and the type of the terminal device using the target channel.

Optionally, the signal may also be a D2D signal, for instance, the signal may be a discovery signal transmitted by the terminal device and used for being accessed by other terminal device.

In the implementation manner, the device 200 is a terminal device, and the second device is a terminal device; the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

Optionally, the target channel belongs to the first channel type, the first channel type includes a plurality of channels, and different channels correspond to the terminal devices of different levels and/or types.

Optionally, the second device is a terminal device; and the processor 310 is configured to call the instructions stored in the memory 320 to perform the following operations:

determine a value range of the bandwidth of the target channel according to at least one of a level and a type of the second device;

determine the bandwidth of the target channel from the value range of the bandwidth of the target channel;

determine a subcarrier interval of the target channel; and determine the number of subcarriers of the target channel according to the bandwidth of the target channel and the subcarrier interval of the target channel.

Specifically, the first device is a network device, and the processor 310 is configured to call the instructions stored in the memory 320 to perform the following operations:

notify value ranges of the bandwidths employed by using the transceiver 330 when the terminal devices of different levels and/or types use the channel of the first channel type, wherein the target channel belongs to a first channel type, the first channel type includes a plurality of channels, and different channels correspond to the terminal devices of different levels and/or types.

Optionally, the second device is a terminal device; and the processor 310 is configured to call the instructions stored in the memory 320 to perform the following operations:

determine a value range of the number of subcarriers of the target channel according to at least one of a level and a type of the second device;

determine the number of subcarriers of the target channel from the value range of the number of subcarriers of the target channel;

determine a subcarrier interval of the target channel; and determine the bandwidth of the target channel according to the number of subcarriers of the target channel and the subcarrier interval of the target channel.

Specifically, the first device is a network device, and the processor 310 is configured to call the instructions stored in the memory 320 to perform the following operations:

notify value ranges of the numbers of subcarriers employed by using the transceiver 330 when the terminal devices of different levels and/or types use the channel of the first channel type, wherein:

the target channel belongs to the first channel type, the first channel type includes a plurality of channels, and different channels correspond to the terminal devices of different levels and/or types.

Optionally, the first device is a terminal device; and the processor 310 is configured to call the instructions stored in the memory 320 to perform the following operations:

determine the bandwidth of the target channel from the value range of the bandwidth of the target channel;

determine a subcarrier interval of the target channel; and determine the number of subcarriers of the target channel according to the bandwidth of the target channel and the subcarrier interval of the target channel.

Optionally, the processor 310 is configured to call the instructions stored in the memory 320 to perform the following operations:

receive first instruction information transmitted by a network device by using the transceiver 330, the first instruction information being used to indicate, for a channel of a first channel type, a number of subcarriers corresponding to at least one of the level and the type of the terminal device;

wherein, the target channel belongs to the first channel type, the first channel type includes a plurality of channels, and different channels correspond to the terminal devices of different levels and/or types.

Optionally, the first device is a terminal device; and the processor 310 is configured to call the instructions stored in the memory 320 to perform the following operations:

determine, by the first device, the number of subcarriers of the target channel from the value range of the number of subcarriers of the target channel;

determine a subcarrier interval of the target channel; and determine the bandwidth of the target channel according to the number of subcarriers and the subcarrier interval of the target channel.

Optionally, the first device is a terminal device, and the processor 310 is configured to call the instructions stored in the memory 320 to perform the following operations:

receive, by the first device, second instruction information transmitted by the network device, the second instruction information being used to indicate, for a channel of a first channel type, a number of subcarriers of the target channel corresponding to at least one of the level and the type of the terminal device, wherein:

the target channel belongs to the first channel type, the first channel type includes a plurality of channels, and different channels correspond to the terminal devices of different levels and/or types.

Optionally, the processor 310 is configured to call the instructions stored in the memory 320 to perform the following operations:

determine a target basic parameter set from a plurality of basic parameter sets;

and determine the subcarrier interval of the target channel from the target basic parameter set.

It should be understood that the device 300 may correspond to the first device in the method 100, and may implement the corresponding functions of the first device in the method 100, which will not be elaborated herein for brevity.

The embodiments of the present application provide a communication system, including any of the first and second devices mentioned above.

Those of ordinary skills in the art may be aware that, in combination with the examples described in the embodiments disclosed herein, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed systems, apparatuses and methods may be implemented in other ways. For example, the apparatus embodiments described above are merely illustrative. For example, the division of the units is only one logical function division. In practice, there may be another division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, each functional unit in each embodiment of the present application may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present application. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

What is claimed is:

1. A signal transmission method, comprising:
   determining, by a first device, a bandwidth and a number of subcarriers of a target channel, wherein the bandwidth or the number of subcarriers of the target channel is determined according to at least one of a level and a type of a terminal device using the target channel; and
   transmitting, by the first device, a signal to a second device via the target channel or receiving, by the first device, a signal transmitted by a second device via the target channel, according to the bandwidth and the number of subcarriers of the target channel, wherein at least one of the first device and the second device is a terminal device;
   wherein the second device is a terminal device; and
   the determining, by the first device, the bandwidth and the number of subcarriers of the target channel comprises:
      determining, by the first device, a value range of the bandwidth of the target channel according to at least one of a level and a type of the second device;
      determining the bandwidth of the target channel from the value range of the bandwidth of the target channel;
      determining a subcarrier interval of the target channel; and
      determining the number of subcarriers of the target channel according to the bandwidth of the target channel and the subcarrier interval of the target channel.

2. The method according to claim 1, wherein the target channel is one of the following: a channel for being accessed by the terminal device, a synchronization channel, a random access channel, and a channel for transmitting system information.

3. The method according to claim 1, wherein when the signal is a downlink signal, the target channel satisfies at least one of following conditions:
   the bandwidth of the target channel is less than or equal to a minimum bandwidth corresponding to at least one of the level and the type of the terminal device using the target channel; and
   the number of subcarriers of the target channel is less than or equal to a minimum number of subcarriers corresponding to at least one of the level and the type of the terminal device using the target channel, and
   wherein when the signal is an uplink signal, the target channel satisfies at least one of following conditions:
   the bandwidth of the target channel is greater than or equal to a minimum bandwidth corresponding to at least one of the level and the type of the terminal device using the target channel; and
   the number of subcarriers of the target channel is greater than or equal to a minimum number of subcarriers corresponding to at least one of the level and the type of the terminal device using the target channel.

4. The method according to claim 1, wherein the first device is a terminal device; and the target channel satisfies at least one of following conditions:
   the bandwidth of the target channel is less than or equal to a minimum bandwidth corresponding to at least one of the level and the type of the terminal device using the target channel; and
   the number of subcarriers of the target channel is less than or equal to a minimum number of subcarriers corresponding to at least one of the level and the type of the terminal device using the target channel.

5. The method according to claim 1, wherein the target channel belongs to a first channel type, the first channel type comprises at least one channel, and different channels correspond to different levels, different types, or different levels and types of the terminal device.

6. The method according to claim 1, wherein the first device is a network device, and the method further comprises:
   notifying, by the first device, value ranges of the bandwidths employed when the terminal devices of different levels, different types, or different levels and types use a channel of a first channel type, wherein the target channel belongs to the first channel type, the first channel type comprises a plurality of channels, and different channels correspond to the terminal devices of different levels, different types, or different levels and types.

7. The method according to claim 1, wherein
   the determining, by the first device, the bandwidth and the number of subcarriers of the target channel comprises:

determining, by the first device, a value range of the number of subcarriers of the target channel according to at least one of a level and a type of the second device;

determining the number of subcarriers of the target channel from the value range of the number of subcarriers of the target channel;

determining a subcarrier interval of the target channel; and determining the bandwidth of the target channel according to the number of subcarriers of the target channel and the subcarrier interval of the target channel.

8. The method according to claim 1, wherein the first device is a network device, and the method further comprises:

notifying, by the first device, value ranges of the numbers of subcarriers employed when the terminal devices of different levels, different types, or different levels and types use a channel of a first channel type, wherein:

the target channel belongs to the first channel type, the first channel type comprises a plurality of channels, and different channels correspond to the terminal devices of different levels, different types, or different levels and types.

9. The method according to claim 1, wherein the first device is a terminal device; and the determining, by the first device, the bandwidth and the number of subcarriers of the target channel comprises:

determining, by the first device, the bandwidth of the target channel from a value range of the bandwidth of the target channel;

determining a subcarrier interval of the target channel; and determining, by the first device, the number of subcarriers of the target channel according to the bandwidth of the target channel and the subcarrier interval of the target channel.

10. The method according to claim 1, wherein the first device is a terminal device; and before the determining, by the first device, the bandwidth and the number of subcarriers of the target channel, the method further comprises:

receiving, by the first device, first instruction information transmitted by a network device, the first instruction information being used to indicate, for a channel of a first channel type, a number of subcarriers corresponding to at least one of the level and the type of the terminal device;

wherein, the target channel belongs to the first channel type, the first channel type comprises a plurality of channels, and different channels correspond to the terminal devices of different levels, different types, or different levels and types.

11. The method according to claim 1, wherein the first device is a terminal device; and the determining, by the first device, the bandwidth and the number of subcarriers of the target channel comprises:

determining, by the first device, the number of subcarriers of the target channel from a value range of the number of subcarriers of the target channel;

determining a subcarrier interval of the target channel; and determining the bandwidth of the target channel according to the number of subcarriers and the subcarrier interval of the target channel.

12. The method according to claim 1, wherein the first device is a terminal device; and before the determining, by the first device, the bandwidth and the number of subcarriers of the target channel, the method further comprises:

receiving, by the first device, second instruction information transmitted by a network device, the second instruction information being used to indicate, for a channel of a first channel type, a number of subcarriers of the target channel corresponding to at least one of the level and the type of the terminal device, wherein:

the target channel belongs to the first channel type, the first channel type comprises a plurality of channels, and different channels correspond to the terminal devices of different levels, different types, or different levels and types.

13. The method according to claim 1, wherein the determining the subcarrier interval of the target channel comprises:

determining a target basic parameter set from a plurality of basic parameter sets; and determining the subcarrier interval of the target channel from the target basic parameter set.

14. A signal transmission device, wherein the signal transmission device is a first device, and the device comprises:

a processor; and a memory for storing instructions executable by the processor;

wherein the processor is configured to:

determine a bandwidth and a number of subcarriers of a target channel, wherein the bandwidth or the number of subcarriers of the target channel is determined according to at least one of a level and a type of a terminal device using the target channel; and transmit a signal to a second device via the target channel or receive a signal transmitted by a second device via the target channel, according to the bandwidth and the number of subcarriers of the target channel, wherein at least one of the first device and the second device is a terminal device;

wherein the second device is a terminal device; and the processor is configured to:

determine a value range of the bandwidth of the target channel according to at least one of a level and a type of the second device;

determine the bandwidth of the target channel from the value range of the bandwidth of the target channel;

determine a subcarrier interval of the target channel; and determine the number of subcarriers of the target channel according to the bandwidth of the target channel and the subcarrier interval of the target channel.

15. The signal transmission device according to claim 14, wherein the target channel is one of the following: a channel for being accessed by the terminal device, a synchronization channel, a random access channel, and a channel for transmitting system information.

16. The signal transmission device according to claim 14, wherein when the signal is a downlink signal, the target channel satisfies at least one of following conditions:

the bandwidth of the target channel is less than or equal to a minimum bandwidth corresponding to at least one of the level and the type of the terminal device using the target channel; and the number of subcarriers of the target channel is less than or equal to a minimum number of subcarriers corresponding to at least one of the level and the type of the terminal device using the target channel, and wherein when the signal is an uplink signal, the target channel satisfies at least one of following conditions:

the bandwidth of the target channel is greater than or equal to a minimum bandwidth corresponding to at least one of the level and the type of the terminal device using the target channel; and the number of subcarriers of the target channel is greater than or equal to a minimum number of subcarriers corresponding to at least one of the level and the type of the terminal device using the target channel.

17. The signal transmission device according to claim 14, wherein the first device is a terminal device;

the bandwidth of the target channel is less than or equal to a minimum bandwidth corresponding to at least one of the level and the type of the terminal device using the target channel; and/or, the number of subcarriers of the target channel is less than or equal to a minimum number of subcarriers corresponding to at least one of the level and the type of the terminal device using the target channel.

18. The signal transmission device according to claim 14, wherein the target channel belongs to a first channel type, the first channel type comprises a plurality of channels, and different channels correspond to different levels, different types, or different levels and types of the terminal device.

* * * * *